United States Patent
Perez et al.

(10) Patent No.: US 9,977,778 B1
(45) Date of Patent: May 22, 2018

(54) PROBABILISTIC MATCHING FOR DIALOG STATE TRACKING WITH LIMITED TRAINING DATA

(71) Applicant: Conduent Business Services, LLC, Dallas, TX (US)

(72) Inventors: Julien Perez, Grenoble (FR); William Radford, Rockdale (AU)

(73) Assignee: Conduent Business Services, LLC, Dallas, TX (US)

( * ) Notice: Subject to any disclaimer, the term of this patent is extended or adjusted under 35 U.S.C. 154(b) by 0 days. days.

(21) Appl. No.: 15/342,590

(22) Filed: Nov. 3, 2016

(51) Int. Cl.
*G10L 15/22* (2006.01)
*G06F 17/27* (2006.01)
*G10L 15/08* (2006.01)

(52) U.S. Cl.
CPC .......... *G06F 17/279* (2013.01); *G06F 17/274* (2013.01); *G06F 17/278* (2013.01); *G10L 15/08* (2013.01); *G10L 15/22* (2013.01); *G10L 2015/088* (2013.01)

(58) Field of Classification Search
CPC ......... G10L 15/10; G10L 15/22; G10L 13/04; G06F 17/27
See application file for complete search history.

(56) References Cited

U.S. PATENT DOCUMENTS

| 9,037,464 | B1 | 5/2015 | Mikolov et al. |
| 2014/0156579 | A1 | 6/2014 | Bouchard et al. |
| 2015/0095033 | A1 | 4/2015 | Boies et al. |
| 2016/0293162 | A1* | 10/2016 | Takahashi ........... G06F 17/2785 |
| 2017/0228366 | A1* | 8/2017 | Bui ....................... G06F 17/279 |

OTHER PUBLICATIONS

U.S. Appl. No. 14/864,076, filed Sep. 25, 2015, Perez, et al.
Bick, "Using constraint grammar for chunking," Proc. 19th Nordic Conf. of Computational Linguistics, vol. 85, pp. 13-26 (2013).
Bishop, et al., "Generative or discriminative? Getting the best of both worlds," Bayesian Statistics, vol. 8, pp. 3-24 (2007).
Bui, et al., "Robust dialog state tracking for large ontologies," Int'l Workshop on Spoken Dialogue Systems, pp. 1-12 (2016).
Bunt, et al., "Towards an ISO standard for dialogue act annotation," Proc. 7th Int'l Conf. on Language Resources and Evaluation (LREC'10), European Language Resources Association (ELRA), pp. 2548-2555 (2010).
Collobert, et al., "Deep learning for efficient discriminative parsing," JMLR Proceedings, vol. 15, pp. 224-232 (2011).
Collobert, et al., "Natural Language Processing (Almost) from Scratch," J. Machine Learning Res., vol. 12, pp. 2493-2537(2011).

(Continued)

*Primary Examiner* — Shreyans Patel
(74) *Attorney, Agent, or Firm* — Fay Sharpe LLP (57) ABSTRACT

A system and method for dialog state tracking employ an ontology in which a set of values are indexed by slot. A segment of a dialog is processed to detect mentions. Candidate slot values are extracted from the ontology, based on the detected mentions. The candidate slot values are ranked. A dialog state is updated, based on the ranking of the candidate slot values, which may be conditioned on the output of a temporal model, which predicts whether the value of the slot has been instantiated, modified, or is unchanged.

21 Claims, 4 Drawing Sheets

(56) References Cited

OTHER PUBLICATIONS

Dredze, et al., "Entity disambiguation for knowledge base population," Conf. on Computational Linguistics, pp. 277-285 (2010).
Ghahramani, et al., "Factorial Hidden Markov Models," Machine Learning, vol. 29(2-3), pp. 245-273 (1997).
Gasic, et al., "Effective handling of dialogue state in the hidden information state POMDP-based dialogue manager" J. ACM Trans. on Speech and Language Processing (TSLP), vol. 7(3):4, pp. 1-4 (2011).
Henderson, et al., "Deep Neural Network Approach for the Dialog State Tracking Challenge," Proc. SIGDIAL 2013, pp. 467-471 (2013).
Henderson, et al., "Word-based dialog state tracking with recurrent neural networks," Proc. SIGDIAL, pp. 296-299 (2014).
Kim, et al., "The Fourth Dialog State Tracking Challenge," Proc. $7^{th}$ Int'l Workshop on Spoken Dialogue Systems, pp. 1-14 (2016).
Lee, et al., "Recipe for building robust spoken dialog state trackers: Dialog state tracking challenge system description," Proc. SIGDIAL 2013, pp. 414-422 (2013).
Lee, "Unsupervised spoken language understanding for a multi-domain dialog system," IEEE Transactions on Audio, Speech & Language Processing, 21(11), pp. 2451-2464 (2013). (Abstract only).
Metallinou, et al., "Discriminative state tracking for spoken dialog systems," Association for Computer Linguistics, pp. 466-475 (2013).
Milone, et al., "Prosodic and accentual information for automatic speech recognition," IEEE Trans. on Speech and Audio Processing, vol. 11(4), pp. 321-333 (2003).
Nuance Communications, "Grammar developer's guide," pp. 1-170 (2007).
Paek, et al., "Conversation as action under uncertainty," UAI '00: Proc. 16th Conf. in Uncertainty in Artificial Intelligence, pp. 455-464 (2000).
Perez, "Spectral decomposition method of dialog state tracking via collective matrix factorization," Dialogue and Discourse, vol. 8(1), pp. 34-46 (2016).
Raux, et al., "Efficient probabilistic tracking of user goal and dialog history for spoken dialog systems," Interspeech, pp. 801-804 (2011).
Ramachandran, et al., "An end-to-end dialog system for TV program discovery," IEEE, pp. 602-607 (2014). (Abstract only).
Serban, et al., "Building end-to-end dialogue systems using generative hierarchical neural network models," AAAI 2016, pp. 1-8 (2015).
Sha, et al., "Shallow parsing with conditional random fields," HLTNAACL, pp. 134-141 (2003).
Thomson, et al., "Bayesian update of dialogue state: A POMDP framework for spoken dialogue systems," Computer Speech & Language, vol. 24(4), pp. 562-588 (2010).
Ulusoy, et al., "Comparison of generative and discriminative techniques for object detection and classification," Toward Category-Level Object Recognition, pp. 173-195 (2006).
Wang, "HWU baseline belief tracker for DSTC 2 & 3," Technical report, Heriot-Watt University, pp. 1-4 (2013).
Wen, et al., "A network-based end-to-end trainable task-oriented dialogue system," arXiv:1604.04562, pp. 1-11 (2016).
Williams, "Using particle filters to track dialogue state," IEEE Workshop on Automatic Speech Recognition & Understanding, ASRU 2007, pp. 502-507 (2007).
Williams, "Exploiting the ASR n-best by tracking multiple dialog state hypotheses," Interspeech, pp. 191-194 (2008).
Williams, "Incremental partition recombination for efficient tracking of multiple dialog states," ICASSP, pp. 5382-5385 (2010).
Williams, "Challenges and opportunities for state tracking in statistical spoken dialog systems: Results from two public deployments," J. Sel. Topics Signal Processing, vol. 6(8), pp. 959-970 (2012).
Williams, "Web-style ranking and SLU combination for dialog state tracking," Proc. SIGDIAL, pp. 282-291 (Jun. 2014).
Williams, et al., "Factored partially observable Markov decision processes for dialogue management," 4th Workshop on Knowledge and Reasoning in Practical Dialog Systems, pp. 76-82 (2005).
Williams, et al., "The dialog state tracking challenge," Proc. SIGDIAL 2013 Conf., pp. 404-413 (2013).
Williams, et al., "Partially observable Markov decision processes for spoken dialog systems," Computer Speech & Language, vol. 21(2), pp. 393-422 (2007).
Young, et al., "POMDP-based statistical spoken dialog systems: A review," Proc. IEEE, vol. 101(5), pp. 1160-1179 (2013).
Žilka, et al., "Comparison of Bayesian Discriminative and Generative Models for Dialogue State Tracking," Proc. SIGDIAL 2013, pp. 452-456 (2013).

* cited by examiner

PROBABILISTIC MATCHING FOR DIALOG STATE TRACKING WITH LIMITED TRAINING DATA

BACKGROUND

The exemplary embodiment relates to dialog systems and finds particular application in connection with a system and method for tracking a dialog state using probabilistic matching with an ontology.

Automated dialog systems interact with users in a natural language to help them achieve a goal. As an example, a user may be interested in finding a restaurant and may have a set of constraints, such as geographic location, date, and time. The system offers the name of a restaurant that satisfies the constraints. The user may then request additional information about the restaurant. The dialogue continues until the user's questions are answered. There are many other applications where dialog systems could be advantageous. For example, in the context of customer call centers, efficient automation could bring a gain of productivity by increasing the probability of success of each call while reducing the overall cost.

The use of autonomous dialog systems is rapidly growing with the spread of smart mobile devices but still faces challenges to becoming a primary user interface for natural interaction using conversations. In particular, when dialogs are conducted in noisy environments or when utterances themselves are noisy, it can be difficult for the system to recognize or understand the user utterances.

Dialog systems often include a dialog state tracker which monitors the progress of the dialogue (dialog and dialogue may be used interchangeably herein). The dialog state tracker provides a compact representation of the past user input and system output in the form of a dialog state. The dialog state encapsulates the information needed to successfully finish the dialogue, such as the user's goal or requests. The term "dialog state" loosely denotes a representation of the knowledge of user needs at any point in a dialogue. The precise nature of the dialog state depends on the associated dialog task. An effective dialog system benefits from a state tracker which is able to accumulate evidence, in the form of observations, accurately over the sequence of turns of a dialogue, and adjust the dialog state according to the observations. However, in spoken dialog systems, where the user utterance is input as a voice recording, the errors incurred by Automatic Speech Recognition (ASR) and Natural Language Understanding (NLU) means that the true user utterance may not be directly observable. This makes it difficult to compute the true dialog state.

A common mathematical representation of a dialog state is a slot-filling schema. See, for example, Williams, et al., "Partially observable Markov decision processes for spoken dialog systems," Computer Speech & Language, 21(2):393-422, 2007, hereinafter, "Williams 2007," In this approach, the state is composed of a predefined set of variables with a predefined domain of expression for each of them. The goal of the dialog system is to instantiate each of the variables efficiently in order to perform an associated task and satisfy the corresponding intent of the user. In the restaurant case, for example, this may include, for each of a set of variables, a most probable value of the variable, such as: location: downtown; date: August 14; time: 7.30 pm; restaurant type: Spanish, (or unknown if the variable has not yet been assigned).

Various approaches have been suggested for defining dialog state trackers. Some systems use hand-crafted rules that rely on the most likely result from an NLU module. See, Williams, "Web-style ranking and SLU combination for dialogue state tracking," Proc. SIGDIAL, pp. 282-291, June 2014; Nuance Communications, 'Grammar developers guide. Technical report," Nuance Communications, 1380 Willow Road, Menlo Park, Calif. 94025, 2007. More recent methods take a statistical approach to estimating the posterior distribution over the dialog states using the results of the NLU step. Statistical dialog systems, in maintaining a distribution over multiple hypotheses of the true dialog state, are able to behave in a more robust manner when faced with noisy conditions and ambiguity.

Statistical dialog state trackers can be categorized into two general approaches (generative and discriminative), depending on how the posterior probability distribution over the state calculation is modeled. The generative approach uses a generative model of the dialog dynamic that describes how the NLU results are generated from the hidden dialog state and uses the Bayes rule to calculate the posterior probability distribution. Generative systems are described, for example, in Williams 2007; Williams, "Exploiting the ASR n-best by tracking multiple dialog state hypotheses," INTERSPEECH, pp. 191-194, 2008; and Williams, "Incremental partition recombination for efficient tracking of multiple dialog states," ICASSP, pp. 5382-5385, 2010. The generative approach has been popular for statistical dialog state tracking, since it naturally fits into the Partially Observable Markov Decision Process (POMDP) type of modeling, which is an integrated model for dialog state tracking and dialog strategy optimization. See, Young, et al., "POMDP-based statistical spoken dialog systems: A review," Proc. IEEE, 101(5):1160-1179, 2013. In the context of POMDP, dialog state tracking is the task of calculating the posterior distribution over the hidden states, given the history of observations.

The discriminative approach aims at directly modeling the posterior distribution through an algebraic closed formulation of a loss minimization problem. Discriminative systems are described, for example, in Paek, et al., "Conversation as action under uncertainty," UAI '00: Proc. 16th Conf. in Uncertainty in Artificial Intelligence, pp. 455-464, 2000; and Thomson, et al., "Bayesian update of dialog state: A POMDP framework for spoken dialogue systems," Computer Speech & Language, 24(4):562-588, 2010.

A primary drawback of these two statistically-based approaches is the need of extensive data to embed the knowledge for inferring a state tracking model. While gathering data is often a feasible task, annotating a gathered dialog corpus can be time-consuming and costly. Virtual annotation based on prior linguistic knowledge, such as grammar, has been proposed. (Deepak Ramachandran, et al., "An end-to-end dialog system for TV program discovery," SLT, pp. 602-607, IEEE, 2014).

INCORPORATION BY REFERENCE

The following references, the disclosures of which are incorporated herein by reference in their entireties, are mentioned:

U.S. Pub. No. 20150095033, published Apr. 2, 2015, entitled TECHNIQUES FOR UPDATING A PARTIAL DIALOG STATE, by Boies, et al.

U.S. application Ser. No. 14/864,076, filed Sep. 25, 2015, entitled GENERATIVE/DISCRIMINATIVE APPROACH FOR TRANSACTIONAL DIALOG STATE TRACKING VIA COLLECTIVE MATRIX FACTORIZATION, by Julien Perez, et al. provides a description of existing generative and discriminative tracking systems and a method for combining the advantages of each.

BRIEF DESCRIPTION

In accordance with one aspect of the exemplary embodiment, a method for dialog state tracking includes providing an ontology in which a set of values are indexed by slot. A segment of a dialog is received. Mentions in the dialog segment are detected. Candidate slot values are extracted from the ontology, based on the detected mentions. The candidate slot values are ranked. A dialog state is updated, based on the ranking of the candidate slot values.

One or more of the detecting mentions, extracting candidate slot values, ranking the candidate slot values, and updating the dialog state may be performed with a processor.

In accordance with another aspect of the exemplary embodiment, a system for dialog state tracking includes memory which stores an ontology in which a set of values are indexed by slot. A mentioned detection component detects mentions in an input dialog segment of a dialog. A searching component extracts candidate slot values from the ontology, based on the detected mentions. A ranking component ranks the candidate slot values. An update component updates a dialog state based on the ranking of the candidate slot values. A contextualizing component conditions the updating of the dialog state for at least one of the slots based on a prediction that the value of the slot has been instantiated or modified. The prediction is made independently of the candidate slot values. A processor implements the mentioned detection component, searching component, ranking component, update component, and contextualizing component.

In accordance with another aspect of the exemplary embodiment, a method for dialog state tracking includes detecting mentions in an input dialog segment of a dialog, identifying candidate slot values based on the detected mentions, ranking the candidate slot values, and updating a dialog state based on the ranking of the candidate slot values. The updating of the dialog state for at least one of the slots is conditioned on the output of a temporal model which predicts whether the value of the slot has been instantiated, modified, or is unchanged.

The detecting mentions, identifying candidate slot values, and the updating of the dialog state may be implemented by a processor.

DETAILED DESCRIPTION

A system and method for dialog state tracking are disclosed which use an ontology for prediction of slot values based on utterances of a user-agent dialog. The predicted slot values may be conditioned based on predictions as to whether the slot value is instantiated, modified, or is unchanged by the current dialog turn.

The exemplary dialog state tracking model sequentially updates its belief of the dialog state using information extracted from utterances. This process can be achieved by the following steps: (1) mention detection, (2) searching the ontology for candidate (slot, value) pairs for the detected mentions, (3) ranking the candidate (slot, value) pairs with a probabilistic ranking model; and optionally, (4) contextualizing the ranked (slot, value) pairs. The statistical model used in ranking can be learned in a process similar to metric learning.

An advantage of the exemplary system and method is the capability to produce a probabilistic dialog state tracking model with a restricted amount of annotated dialog data by leveraging the distance between a predefined ontology of acceptable assignments of the tracked variables.

The system and method assumes that a small collection of annotated dialogs is available. This is often the case in the industrial environment where there is generally little data available for a given dialog context. A parametric matching function is learned in order to assess the presence of a {slot, value} tuple in a text span of a dialog's utterance. The method makes use of a segment-specific approach that attempts to identify ontology values as precisely as possible using the statistical model. By formalizing the state tracking model as a contextually conditioned named entity linking task, the need for an explicit dataset of state tracking is relaxed.

Figure 1:
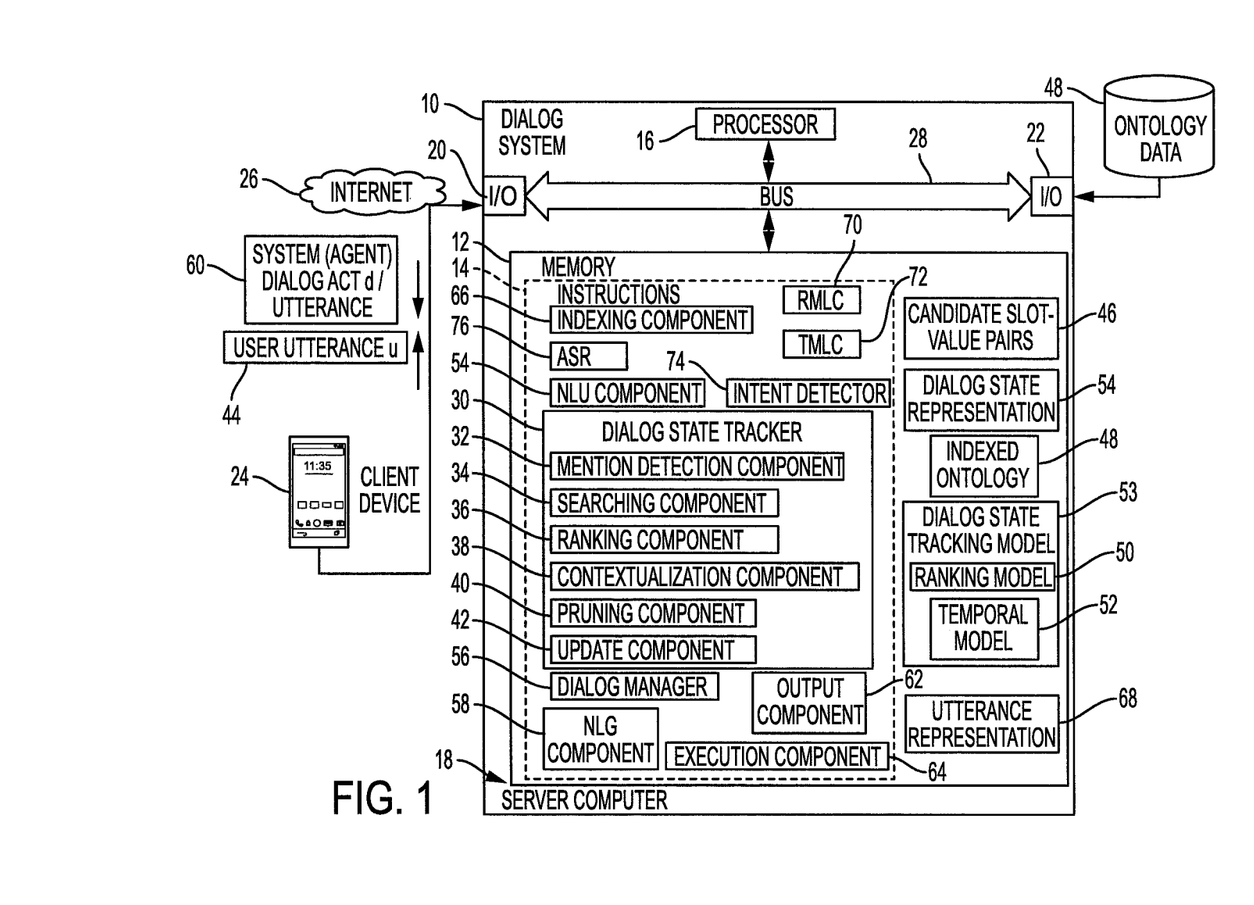
FIG. 1 is a functional block diagram of a dialog system in accordance with one aspect of the exemplary embodiment.

With reference to FIG. 1, a dialog system 10 is shown. The dialog system is configured for conducting a dialog in a natural language, such as English or French, with a user. The exemplary system sequentially updates its belief of the dialog state using information extracted from utterances.

Figure 2:
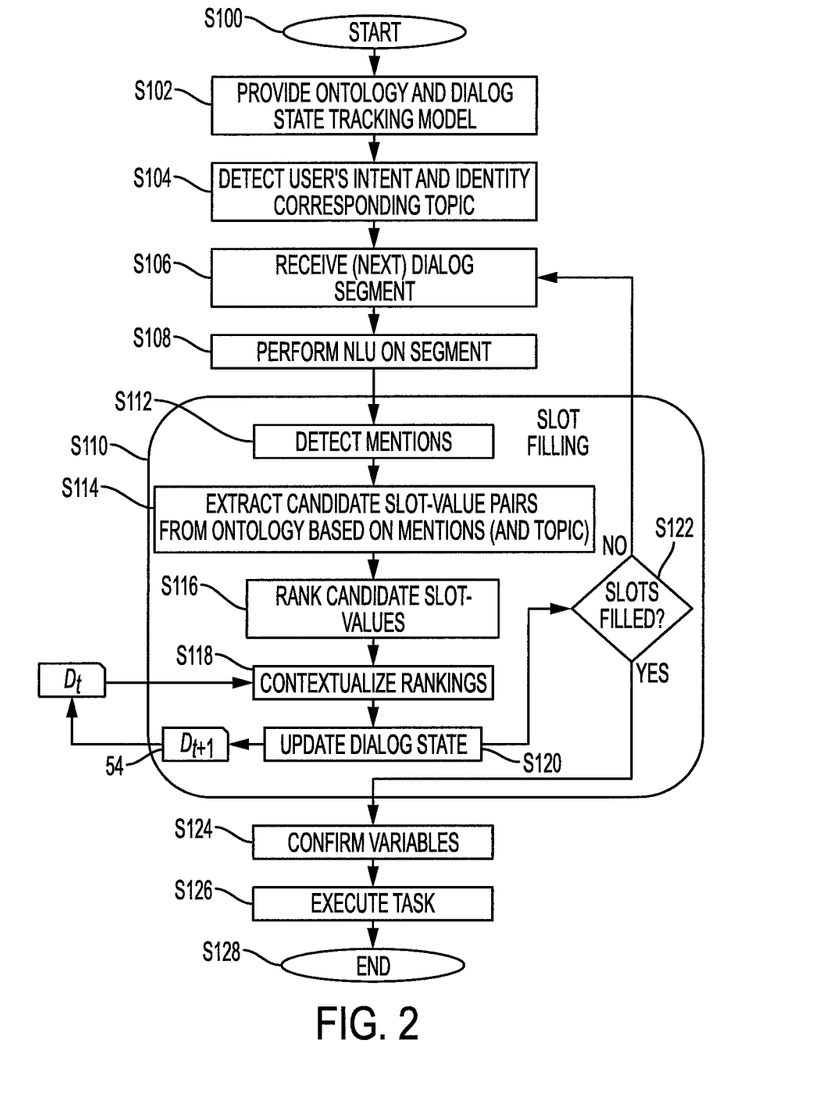
FIG. 2 is a flow diagram illustrating a dialog tracking method in accordance with another aspect of the exemplary embodiment.

The system 10 includes memory 12 which stores instructions 14 for performing the method illustrated in FIG. 2 and a processor 16 in communication with the memory for executing the instructions. The system 10 may include one or more computing devices 18, such as the illustrated server computer. One or input/output devices 20, 22 allow the system to communicate with external devices, such as the illustrated client device 24 via wired or wireless connections 26, such as the Internet, telephone line, mobile communication network, or the like. Hardware components 12, 16, 20, 22 of the system are communicatively connected by a data/control bus 28.

The software instructions 14 include a dialog state tracker 30 which includes a mention detection component 32, a searching component 34, a ranking component 36, a contextualization component 38, an optional pruning component 40, and an update component 42.

The mention detection component 32 detects mentions in an input utterance 44.

The searching component 34 identifies candidate ontology slot value pairs 46 for the detected mentions using an indexed ontology 48.

The ranking component 36 ranks (i.e., scores and/or orders) the candidate slot value pairs 46, retrieved by the searching component, with a probabilistic ranking model 50 and outputs a set of the most highly-ranked candidates.

The optional pruning component 40 may be used to prune inconsistent slot values from the state, preferring NEIGHBORHOOD to PLACE values in the ATTRACTION topic, and TO or FROM values to STATION in TRANSPORTATION.

The contextualization component 38 uses a temporal model 52, such as a spectral tracking model to validate the instantiation and/or modification of the slot values proposed by the ranking component. Together, the ranking model 50 and spectral tracking model 52 form a dialog state tracking model 53. The contextualization component 38 and spectral tracking model 52 may be omitted in some embodiments. In the illustrative embodiment, the contextualizing component conditions the updating of the dialog state for at least one of the slots based on a prediction that the value of the slot has been instantiated or modified. This prediction is made independently of the candidate slot values ranked by the ranking component.

The update component 42 updates the belief over the dialog states, based on the validated ranked candidates 46, which may be stored as a set of current slot values in a representation 54 of the dialog state.

The dialog state tracker 30 receives utterances to be processed from a Natural Language Understanding (NLU) component 54. The NLU component 54 receives the human-generated utterances 34 from the client device 24 and converts them to a form that can be processed by the dialog state tracker 30. In the case of spoken utterances, this may include speech-to-text conversion.

A dialog manager 56 determines the next information (or confirmation/clarification) to be sought, based on the current belief 54 and provides this to a Natural Language Generation (NLG) component 58, which generates a dialog act (next utterance) 60 of a virtual agent, based on the input from the dialog manager. The dialog act 60 may be in the form of speech, text, or information for generation of the speech or text by the client device. An output component 62 outputs the dialog act 60 to the client device. When the dialog manager 56 determines that the slots representing the constraints have all been filled, it passes the values in the slots to an execution component 64, which executes a task based on the values, e.g., making a restaurant or flight reservation in an illustrative embodiment. Provision may be made for a human agent to participate in the dialog, for example, if the dialog manager 56 determines that the dialog is not advancing the belief over the dialog state.

A dialog state tracking task of interest can be formalized as follows: at each turn of the dialogue, the dialog manager 56 chooses a dialog act 60, denoted d to express and the user answers to the system with a user utterance 44, denoted u. The dialog state at each turn of a given dialog is defined as a distribution over the set of predefined variables to track that defines the structure of the dialog state. The construction of the dialog state 54 is referred to as slot filling. In a transactional dialogue, the state tracking task entails estimating the value of each of a set of predefined variables in order to perform a task associated with the task to which the dialogue is supposed to correspond.

Optionally, an ontology indexing component 66 generates the indexed ontology 48, which is used by the mentions detection component. The ontology indexing component 66 may access a preexisting ontology or ontology data 68, from which the indexed ontology is generated.

A ranking model learning component (RMLC) 70 may be provided for generating the ranking model 50, which is used by the ranking component 36.

A temporal model learning component (TMLC) 72 may be provided for generating the temporal model 52, which is used by the contextualization component 38.

If there is more than one type of transaction handled by the system, an intent detection component 74 may be used to identify the user's intent in order to determine the set of variables to be instantiated in the model. As an example, the user of the client device 24 may express an intent to book a flight and the intent detection component identifies the variables: destination, date, and time (hour), which are each to be instantiated from a respective set of predefined values. The variables correspond to the slots to be filled by the belief update component.

The computer-implemented system 10 may include one or more computing devices 18, such as a desktop, laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data.

The network interface 20, 22 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 18.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 illustrates a dialog tracking method which may be performed with the system of FIG. 1. The method begins at S100.

At S102, an indexed ontology 48 is provided in which values are indexed according to slots, each slot being selected from a predetermined set of slots. S102 may include generating the indexed ontology 48 or accessing an existing one. A dialog state tracking model 53 is also provided, e.g., generated or an existing one accessed.

At S104, at or near the start of a dialog between a user and an agent, the user's intent may be detected, by the intent detection component 74.

At S106, a (next) segment of the dialog is received, such as a user utterance.

At S108, the dialog segment is processed to generate a text sequence, e.g., with the NLU component 54.

At S110, a dialog state representation 54 is updated, based on the text sequence, which entails filling/updating slots of the representation 54 with variables in some or all iterations of this step. The slot filling may include: detecting mentions in the text sequence (S112), extracting candidate (slot, value pairs) for the mentions from the indexed ontology (S114), ranking the candidate (slot, value) pairs (S116), contextualizing them (S118), and updating the dialog state (S120).

These steps are performed substantially iteratively until the predefined slots are each filled, e.g., with a respective most probable value of the respective variable having at least a threshold probability score. Step S120 outputs a current dialog state $D_{t+1}$, which is input as $D_t$ in the next iteration.

If at S122, there are lots to be filled, the method then returns to S106. Once all the variables have been correctly instantiated, as in existing dialog systems, a last general confirmation of the task wished by the user may be performed (S124) before executing a requested task (S126). The method ends at S128.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 18, (for example, an internal hard drive of RAM), or may be separate (for example, an external hard drive operatively connected with the computer 18), or may be separate and accessed via a digital data network such as a local area network (LAN) or the Internet (for example, as a redundant array of inexpensive of independent disks (RAID) or other network server storage that is indirectly accessed by the computer 18, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and/or 4, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Further details of the system and method will now be described.

The Indexed Ontology

The indexed ontology 48 is generated by indexing each potential slot value. The index can be built using straightforward linguistic preprocessing for performance consideration including word stemming, a character n-gram analysis (e.g., for n ranging from 2 to 6), word embedding cosine similarity calculus and or phonetic representation (using, for example, characters from a phonetic alphabet) for distant matching. Thus, a given slot value can be matched to a plurality of different mentions.

As an example, the indexed ontology can be built using WHOOSH (https://bitbucket.org/mchaput/whoosh). Whoosh is a full-text indexing and searching library implemented in pure Python which indexes each value using an English language analyzer, that includes stemming, and a character n-gram analyzer (n ranging from 2 to 6) for distant matching.

The index 48 may store the potential slot values as tuples of the form (TOPIC, SLOT, VALUE), where each TOPIC represents a different user intent, each SLOT indicates the identifier of the slot which can be instantiated with a VALUE. For example, a tuple could be (2, 5, Turin), where the TOPIC 2 corresponds to "make an airline reservation," the SLOT 5 corresponds to "destination," and the VALUE is "Turin."

The ontology data, e.g., in the form of a lexicon, from which the indexed ontology is generated, may be generated automatically or at least partially manually. In the illustrative example, may include a list of origin and destination airports in one or more languages. In one embodiment, such a lexicon can be built automatically, for example, using the method of Nobuhiro Kaji, et al., "Building lexicon for sentiment analysis from massive collection of HTML documents," EMNLP-CoNLL, pp. 1075-1083, ACL 2007.

As will be appreciated, the TOPIC can be omitted from the tuples if the system is directed to a single user intent only.

The Ranking Model

The ranking model 50 may be a probabilistic model that outputs a set of candidate matches for each detected mention, which may be ranked based on a score. Each match is or is derived from one of the tuples. For example, the candidate matches can each be a (SLOT, VALUE) pair, given that the TOPIC also matches. The ranking model 50 may be a classifier that is trained on a set of features extracted from mentions in TOPIC-relevant text and their (SLOT, VALUE) pair labels. Example features include lemma form, maximum edit distance, word embeddings, e.g., multidimensional vectors generated with a neural network, such as word2vec (see, for example, Mikolov, et al., "Efficient estimation of word representations in vector space," arXiv:1301.3781, 2013 and the google code for word2vec at https://code.google.com/archive/p/word2vec/), combinations thereof, and the like.

The model 50 may be learned with logistic regression or other suitable learning technique. As an example, a logistic regression classifier is learned using scikit-learn (http://scikit-learn.org).

More formally, the model 50 aims at estimating the probability p(v|m) of a {slot, value} pair v, given a mention m, with w being the model's parameters to learn and φ(v,m) the feature functions which relate mentions to (slot, value) pairs. For example:

$$p(v \mid m) = \frac{1}{1 + e^{-w^T \phi(v,m)}}, \quad (2)$$

where T represents the transpose operator.

Once ranking is computed, the scores associated with each value that meet a given threshold γ are kept. The threshold γ may be estimated by cross-validation.

In the learning stage (S102), a mention's candidates are assigned a value of 1 if the candidate is present in a predefined set of gold-standard tuples for the segment. All other candidates are assigned the value 0. A list of candidates may include multiple instances with the value 1, depending on the search. NIL candidates may be used to model the case of a lack of a matching candidate, one for each of the slots that were retrieved in the candidates. Where a 1 instance is found, the NIL candidate is labelled 0, otherwise 1. The NIL candidates have three features: NIL topic, NIL slot, and NIL slot value.

Table 1 provides example features, some or all of which may be used by the ranking model. Also shown are example feature values for the mention "airport" and ontology value (TRANSPORTATION, FROM, SINGAPORE CHANGI AIRPORT).

TABLE 1

Example Features used by the ranking model

| Name | Description | Example of feature = value |
|---|---|---|
| ir_score | The full-text index score. | ir_score = 89.50 |
| ir_score_pct | The full-text index score divided by the highest scoring candidate. | ir_score_pct = 0.67 |
| ir_rank | The rank of this candidate in the full-text index results. | ir_rank = 4 |
| ir_size | The number of full-text index results. | ir_size = 15 |
| ratio | The edit-distance between the mention and value (case-insensitive) Can be computed using FUZZY. | ratio = 45 |
| prt_ratio | The partial edit-distance between the mention and value (case-insensitive). Can be computed using FUZZY. | prt_ratio = 100 |
| stem_ratio | The same as ratio, but using Porter-stemmed tokens. | stem_ratio = 47 |
| stem_prt_ratio | The same as prt_ratio, but using Porter-stemmed tokens. | stem_prt_ratio = 100 |
| slot | The slot of the candidate. | slot -FROM = 1 |
| slot_mention | The slot and mention tokens of the candidate. | slot_mention: FROM:airport = 1 |
| slot_context | Bag-of-words from the utterance, not including the mention, joined with the slot. | slot_context: FROM:And = 1 |
| left_context | Bag-of-words from the three tokens before the mention, joined with the slot. | left_context: FROM:from = 1 |
| right_context | Bag-of-words from the three tokens after the mention, joined with the slot. | right_context: FROM:### = 1 |
| cos_emb | The cosine similarity between phrase embeddings of the mention and value. Phrase embeddings are the average of token WORD2VEC embeddings. | cos_emb = 0.72 |

Intent Detection, S104

Intent detection is generally a NLU problem entailing identifying the task the user wishes the system to accomplish. This step determines the set of variables to instantiate during the slot-filling process. The dialog management assumes that a set of variables is required for each predefined intent.

Natural Language Understanding (S108)

In one exemplary embodiment, where the utterances are spoken (voice) utterances, the NLU component 54 processes the user utterance u 44 and generates an N-best list: o={<$d_1 f_1$>, ..., <$d_n, f_n$>}, where $d_i$ is a hypothesized user dialog act and $f_i$ is its associated confidence score. Each hypothesized user dialog act is a sequence of words (or, more generally, tokens) predicted to correspond to the user's utterance u. The NLU component 54 may receive as input the output of an automatic speech recognition (ASR) module 76, which converts the spoken utterance 44 to text. In a text based dialog system, where the utterances are in the form of text strings, the ASR module and optionally also the NLU module may be omitted and the text string(s) considered as the user dialog act d.

Slot Filling (S110)

For each TOPIC (user intent), there is a set of at least two or at least three slots to which values are assigned in the slot filling process, e.g., in a probabilistic manner.

For example the set of slots for the TOPIC: FOOD, could include NEIGHBORHOOD, PLACE, TYPE_OF_PLACE, CUISINE, DISH, DRINK, MEAL-TIME, and the like. Additionally, an INFO slot may be included for each TOPIC. The INFO slot can be used for variables which have an indefinite number of slot values, but are not needed for some topics.

Detecting Mentions (S112)

The purpose of this step of the slot-filling process is to extract candidate mentions in the current utterance of an on-going dialog. These mentions will be used as a basis for slot value matching in the ontology 48 for the dialog's domain. It can be assumed that most slot values (not including INFO slots, discussed below) will be explicitly mentioned in the dialog, usually as a noun phrase. Because of this, the number of extracted text-spans to consider is reduced and the extraction can be performed without state tracking annotations in the form of labeled text-spans but with annotations at the utterance or even dialog segment level. The text is processed, e.g., tokenized to form a sequence of tokens. Disfluency markers, which are non-lexical vocables that occur within the flow of otherwise fluent speech may be detected and normalized (e.g., "huh", "uh", "erm", "urn"), as well as removing markers, such as "_", that indicate unrecognized speech.

Noun phrase (NP) chunks are then identified, which are referred to herein as mentions. Part-of-speech (POS) tags may first be assigned to the tokens, followed by chunking.

Chunking usually selects non-overlapping subsets of the tokens as chunks. NP chunking entails recognizing the chunks that comprise or consist of noun phrases. In one embodiment, a statistical model may be used identify the NP chunks. The NP detection model is trained on training data, such as prior user utterances. One suitable parameterized statistical model for NP chunk detection is the SENNA model (http://ml.nec-labs.com/senna; Ronan Collobert, et al., "Natural Language Processing (Almost) from Scratch," J. Machine Learning Research, 12 2493-2537(2011)). Statistical (e.g., Fei Sha et al.," Shallow parsing with conditional random fields," HLTNAACL 2003) and symbolic (e.g., Eckhard Bick, "Using constraint grammar for chunking," Proc. NODALIDA, pp. 13-26, 2013) approaches may also be used.

Searching for Ontology Candidate (Slot, Value) Pairs (S114)

A full-text indexed search of the index of ontology values 48 is performed to extract candidate matches for each identified mention. The search may be limited to retrieving a maximum and/or minimum number of matching candidates, such as up to 100, or up to 30. Each candidate is a tuple of (TOPIC, SLOT, VALUE), although the topic is given and so is the same for each candidate. The output can thus be a set of (SLOT, VALUE). Each candidate match includes a VALUE which matches the mention either exactly or approximately, based on the stemming and character n-gram analysis associated with the VALUE in the model. For example, suppose that a detected mention is Roam Airport, the mention can be matched with the SLOT, VALUE (Destination, Rome Airport).

Ranking Slot Values (S116)

The ranking model 50 is used to rank the candidate (slot, value) pairs by computing a score using the features extracted for each mention. The highest scoring candidates are retained, such as the top three (unless a NIL candidate is encountered, in which case, fewer than three candidates are retained).

The ranking model 50 uses features that aim at encoding the match between an extracted mention and the candidate variable-value pair. A first matching decision is taken using a logistic regression model, using, for example, the features shown in TABLE 1. The features may thus include lexicalized and delexicalized features. The model estimates the probability $$p(v \mid m) = \frac{1}{1 + e^{-w^T \phi(v,m)}}$$

of a {slot, value} pair v given a mention m, with the model's parameters w and the feature functions φ(v,m). For each slot, the (three) most probable candidates are considered. However, the presence of a NIL candidate in the top-3 list acts as a threshold.

As will be appreciated, Steps S114 and S116 may be combined into a single step in which feature vector associated with each mention is input to the ranking model without first identifying the candidate slot values.

Contextualization (S118)

In one embodiment, a spectral method for contextualization is employed. In the contextualization step, each matching decision taken during the ranking step is conditioned on the output of a spectral tracking (temporal) model 52 of dialog state transitions. It is assumed that each variable (slot) of a given dialog state tracking task tends to follow a recurrent dynamic on a given domain-specific dialog corpus. For example, during a travel booking dialog, the variable keeping track of the destination value tends to be informed near the beginning of the dialog and is kept constant during the overall dialog. On the other hand, the variables keeping track of the travel preferences can change dramatically throughout a given dialog.

In this situation, a conventional variable-value spectral tracking model as proposed in Seokhwan Kim, et al., "The Fourth Dialog State Tracking Challenge," Proc. 7th Intl Workshop on Spoken Dialogue Systems (IWSDS) 2016, would not be feasible due to the lack of annotated data.

In the exemplary temporal model 52, each variable composing the tracked state is represented using a 3-dimensional indicator (i.e., sparse) variable that encodes the following discrete alternatives: (1) non-instantiated, (2) instantiated, and (3) modified. Thus for example, the destination "Rome" may be detected in a given turn of the dialog, in which case the "destination" variable may be predicted to have a 3 dimensional indicator (0,1,0) for that turn, indicating that the destination slot is instantiated. This temporal model corresponds to the probability of a tracked variable at time t being affected by an observation, a dialog turn or segment at time t+1, independently of its current value instantiation. Using a spectral decomposition method, the state is inferred and the final decision is conditioned by the result of the state evolution.

The temporal model 52 employs utterance representations 68, which may be generated by the contextualization component 38. Each representation 68 may include a bag of words (BoW) representation of the respective turn of the dialogue. The bag of words representation may include, for each of a set of words, a value representative of whether or not the word is present in the user dialog act u (and optionally also the corresponding system dialog act d). In the simple case, this may be considered as the only evidence on which the representation 68 is based. However, standardized dialog act schemas can be considered as (or part of) the evidence on which the representation is based. See, for example, Bunt, et al., "Towards an ISO standard for dialogue act annotation," Proc. 7th Intl Conf. on Language Resources and Evaluation (LREC'10), European Language Resources Association (ELRA), pp. 2548-2555, 2010. In one embodiment, if prosodic information (e.g., information on intonation, tone, stress and/or rhythm of the user utterance 44) is available in the output of an available automated speech recognition (ASR) system, it can also be considered as evidence. See, Milone, et al., "Prosodic and accentual information for automatic speech recognition," IEEE Trans. on Speech and Audio Processing, 11(4):321-333, 2003.

Figure 3:
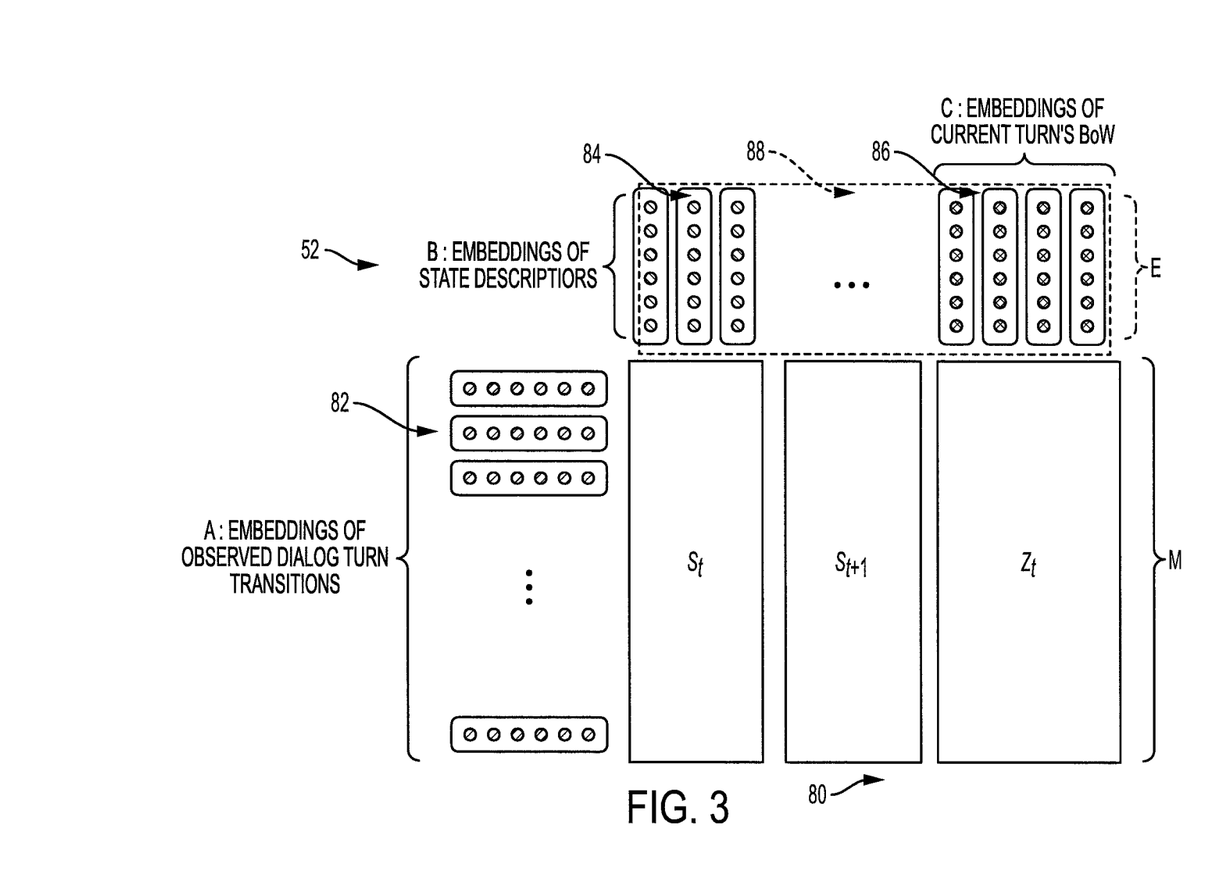
FIG. 3 illustrates collective matrix factorization for contextualized metric learning of spectral state tracking in a transactional dialog.

FIG. 3 schematically illustrates a collective factorization model 52 associated with this inference task, in which $S_t$ is the description of the variable composing the state at time t, $S_{t+1}$ is the description of the variable composing the state at time t+1 and $Z_t$ is a sparse representation of the Bag of Words of the utterance in the turn at time t. A matrix M 80 is the concatenation of the matrices $\{S_t, S_{t+1}, Z_t\}$ includes a row for each turn of the dialog. A matrix A 82 includes for each row, an embedding of the observed dialog turn transitions $\{s_t, s_{t+1}, z_t\}$. A matrix B 84 includes the embeddings of the state descriptors $(S_t, S_{t+1})$, for each variable, and matrix C 86, the embeddings of the current turn's BoW 68.

Figure 4:
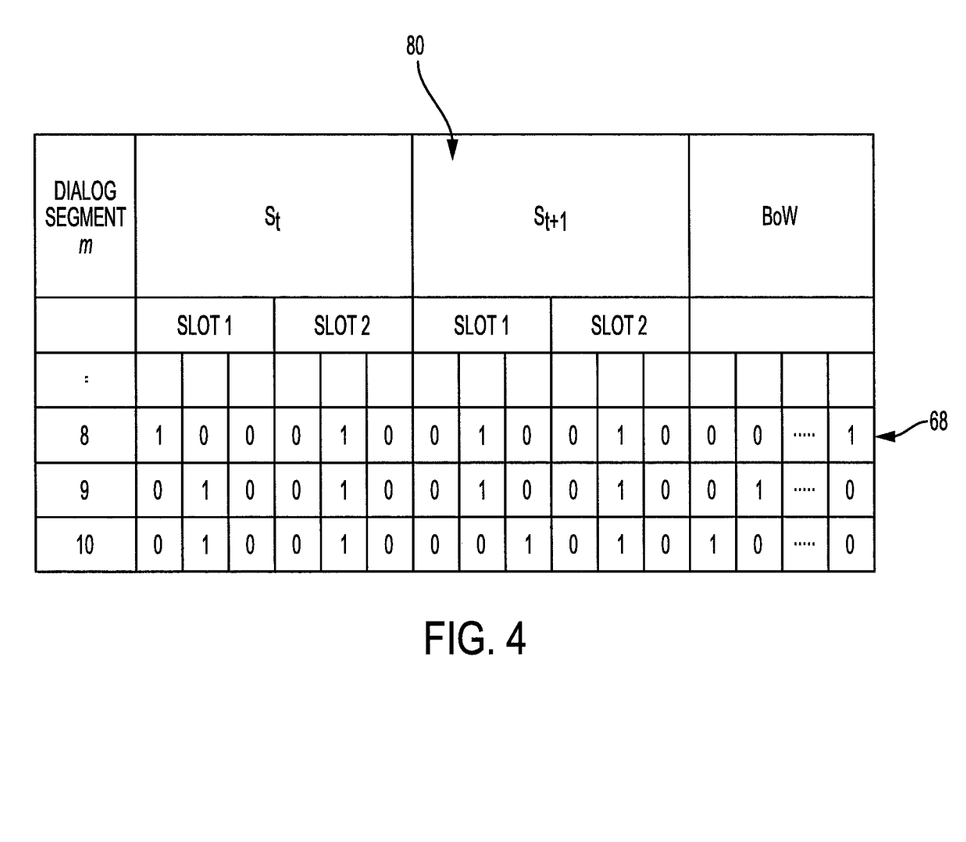
FIG. 4 illustrates an illustrative matrix that is factorized to generate instantiation and modification predictions for a set of the slots in the current dialog state.

FIG. 4 illustrates a portion of matrix M in an illustrative embodiment. Only two slots are illustrated, by way of example. The matrix includes rows m corresponding to dialog segments. In row 8, in the initial state $S_t$, slot 1 is predicted to be non-instantiated, while slot 2 is predicted to have been instantiated with a value (although the matrix M does not predict what the value is). Based on the BoW $S_t$, and the latent variables in matrices A and E, the row is completed with the next state $S_{t+1}$ is predicted for each slot. In the illustrative embodiment, in row 8, slot 1 is predicted to be instantiated and slot 2 to be instantiated and unchanged.

The learning and inference procedures for this contextualization task are now described, by way of example. For the sake of simplicity, the {B, C} matrices are concatenated to form matrix E 88.

1. Learning the Spectral Tracking Model (S102)

The tracking models A, B, C, and M are learned by a learning component of the contextualization component using sequences of dialog turns annotated with their corresponding state descriptors. The matrices A, B, and C may be initialized with random or otherwise generated initial values. Matrix M may be initialized with the available training data.

The optimization task, i.e., the loss function, associated with the learning problem of latent variable tracking {A,E} can be as defined in Equation 2:

$$\min_{A,E} \|(M - AE)W\|_2^2 + \lambda_a \|A\|_2^2 + \lambda_b \|E\|_2^2, \quad (2)$$

i.e., a function of the minimum of the difference between actual matrix M and the product of latent variable matrices A and B, conditioned by weights W, where $\{\lambda_a, \lambda_b\} \in \mathbb{R}^2$ are regularization hyper-parameters (scalar values), which can be learned by cross validation, and W is a diagonal matrix that increases the weight of some of the state variables, $s_{t\pm1}$ in order to bias the resulting parameters {A,E} toward better predictive accuracy on these specific variables.

The weight matrix W can be learned by cross validation. The weights are selected to improve the agreement between a reconstructed matrix M' (formed as the product of matrices A and B) with the actual matrix M. $\|\cdot\|_2^2$ represents the Frobenius norm of the respective matrix (the square root of the sum of the absolute squares of its elements). However, other matrix norms may be employed. In the exemplary embodiment, the weight matrix has a greater impact on at least some of the final state descriptor features of the reconstructed matrix M than for the corresponding features of the initial state descriptor.

An Alternating Least Squares method that is a sequence of two convex optimization problems can be used to perform the minimization task. First, for known E, the first step is to compute:

$$A^* = arg\ \min_A \|(M - AE)W\|_2^2 + \lambda_a \|A\|_2^2, \quad (3)$$

then for a given matrix A, the matrix E which minimizes Eqn. 3 is computed:

$$E^* = arg\ \min_E \|(M - AE)W\|_2^2 + \lambda_b \|E\|_2^2 \quad (4)$$

At the start, matrix A (and/or E) may be initialized with random values or with a singular value decomposition of matrix M.

By iteratively solving these two optimization problems, the following fixed-point regularized ridge regression forms are obtained which are regularized and weighted using alternating least square algorithms where t corresponds to the current step of the overall iterative process:

$$A_{t+1} \leftarrow (E_t^T W E_t + \lambda_a \mathbb{I})^{-1} E_t^T W M \quad (5)$$

$$E_{t+1} \leftarrow (A_t^T A_t + \lambda_b \mathbb{I})^{-1} A_t^T M \quad (6)$$

where $\mathbb{I}$ is the identity matrix.

As shown in Equation 5, matrix W is only involved for the updating of A because only the subset of the columns of E, representing the features of the state to predict, are weighted differently in order to increase the importance of the corresponding columns in the loss function. For the optimization of the latent representation composing E, in Equation 6, each call session's embeddings stored in A hold the same weight, so in this second step of the algorithm, W is actually an identity matrix and so does not appear.

2. Prediction of Instantiation or Modification of Slot Values (S118)

When a new observation $Z_t$ is received at time t, the posterior distribution of each of the state variables at time t+1 is predicted given $s_t$ and the latent variable matrices A and E.

The prediction process includes (1) computing the embedding of a current transition by solving the associated least square problem based on the two variables $\{s_t, z_t\}$ that correspond to the current knowledge of the state at time t and the set of observations extracted from the last turn that is composed with the system and user utterances, (2) estimating the missing values of interest, i.e., the likelihood of each possible state of each variable at time (t+$^1$), $s_{t+1}$, by computing the cross-product between the transition embedding calculated in (1) and the corresponding column embeddings of E, and of the 3-dimensional state of each variable of $s_{t+1}$. More precisely, this decomposition can be written as:

$$M = A \cdot E^T \quad (7)$$

where M is the matrix of data to decompose and · is the matrix-matrix product operator. As noted above, A has a row for each transition embedding, and E has a column for each variable-value embedding in the form of a zero-one encoding. When a new row of observations $m_i$ for a new set of variables of state $s_i$ and observations $z_i$ and E is fixed, the purpose of the prediction task is to find the row $a_i$ of A such that:

$$a_i \cdot E^T \approx m_i^T \quad (8)$$

Even though it is generally difficult to require these to be equal, these last elements can be required to have the same projection into the latent space:

$$a_i^T \cdot E^T \cdot E = m_i^T E \quad (9)$$

Then, the classic closed form solution of a linear regression task can be derived:

$$a_i^T = m_i^T \cdot E \cdot (E^T \cdot E)^{-1} \quad (10)$$

$$a_i = (E^T \cdot E)^{-1} \cdot E^T \cdot m_i \quad (11)$$

Equation 10 is the optimal value of the embedding of the transition $m_i$, assuming that a quadratic loss function is used. Otherwise it is an approximation, in the case of a matrix decomposition of M using a logistic loss for example. Note that, in Equation 10, $(E^T \cdot E)^{-1}$ requires a matrix inversion, but it is for a low dimensional matrix (the size of the latent space).

Thus, given $m_i$ (which includes only the values of $s_t^i$ and $z_t^i$), at step (1) the embedding $a_i$ is computed using Eqn (11). Then at step (2) the missing values $s_{t+1}^i$ are computed by multiplying $a_i$ by only those the columns of matrix B corresponding to the embeddings of the $s_{t+1}$ state features.

Several advantages can be identified in this approach. First, at learning time, alternative ridge regression is computationally efficient because a closed form solution exists at each step of the optimization process employed to infer the parameters, i.e., the low rank matrices, of the model. Second, at decision time, the state tracking procedure entails simply (1) computing the embedding a of the current transition using the current state estimation $S_t$ and the current observation set $z_t$ and (2) computing the distribution over the state defined as a vector-matrix product between a and the latent matrix E. In contrast, a proper matrix completion task would have required a matrix M with missing value corresponding to the exhaustive list of the possible triples $s_t,s_{t+1},z_t$, which is generally intractable to represent and decompose.

The prediction output of the temporal model 52 is the distribution over the values for each of the state variables $s_{t+1}$ at time t+1, which are used to bias the selection of ranked candidate slot values output at S116 towards those that comply with the predicted state variables $s_{t+1}$. For example, if the contextualization step predicts that a variable is initialized from $s_t$ to $s_{t+1}$, then a slot value pair is more likely to be input into the initialized slot. Similarly, if the state variable $s_{t+1}$ predicts a modification to the slot value, a slot value pair which is different from the already instantiated one is more likely to be selected to fill the slot.

Using this second inference procedure of variable dynamic tracking, the candidate matching produced during the ranking step S116 of the tracking process can be accepted or rejected, depending on the probability of modification or initial instantiation produced by the spectral analysis at the slot evolution level. The acceptance threshold β can be estimated through cross-validation. More precisely, depending of the current state $s_{t+1}$ of a given variable, the instantiation or modification attempt of the ranking model may be either accepted or not accepted and the dialog state updated accordingly (S120).

Classifying INFO Values

In one embodiment, a logistic regression model may be used to model the likelihood of a value with respect to the INFO slot for the respective topic. The decision is supported by n-grams (1, 2 and 3) of raw and stemmed tokens using the pre-processing and classifiers above and one model is produced for each topic. The model is $l_1$ regularized, with hyper-parameters optimized using 5-fold cross-validation on the training set. Independent models may be learned for each topic, which may have varying performance. All segment utterances encountered so far may be used for training and prediction and the top value retained.

The dialog state tracker described herein finds application in a variety of machine learning-based autonomous dialog systems. The ranking model can be generated with limited training data as compared to existing generative and discriminative dialog state tracking systems. The contextual usage of a knowledge base or existing lexicon as an a-priori variable taxonomy reduces the time needed to generate the ontology. The spectral model of tracking contextualization, which may be used as a second part of the inference procedure, reduces the computation time.

Without intending to limit the scope of the exemplary embodiment, the following examples illustrate application of the method.

EXAMPLES

A ranking model 50 was learned using the features described in TABLE 1 above that aim at encoding the match between a mention and the candidate value. For the model 50, a logistic regression classifier was learned using scikit-learn http://scikit-learn.org. Some of the features were generated using tools, such as NLTK for stemming, FUZZY https://github.com/seatgeek/fuzzywuzzy for string edit-distances and WORD2VEC for word embeddings. Google News embeddings were obtained from https://code.google.com/p/word2vec.

During initial experimentation, the model 50 is learned using 10-fold cross validation over the training set provided in the 4th Dialog State Tracking Challenge (DSTC4) (see, Kim 2016), with a grid search to choose the optimal hyper-parameters.

In the training set, there are 190,055 instances, 15% of them true, and the best model 50 performed with mean F1 of 89.3% using $l_2$ regularization (C=1). During tracking, the same procedure is applied for search and feature extraction, then the probability of each candidate is predicted using the model 50. For each slot, the three most probable candidates from the list are retained, until the NIL candidate is observed, which acts as a threshold.

Candidate mentions in the current utterance of an on-going dialog are extracted. The text is preprocessed by tokenizing using NLTK (http://www.nitk.org) and disfluency markers (e.g., urn, % UH) are normalized, removing markers such as ~, using the SENNA model to identify the NP chunks (mentions).

A full-text index of ontology values 48 is built using WHOOSH (https://bitbucket.org/mchaput/whoosh), as described above. The ontology index is searched for candidate matches for each mention. Searches are limited to 30 (TOPIC, SLOT, VALUE) candidates and a ranked list of matches is built with their scores.

The DSTC4 dataset is small, 35 dialogs total, which makes typical, strictly data-driven, learning types of approach challenging. The overall measurement is divided into two schedules. The first schedule corresponds to an utterance based tracking, where the scoring is performed after each utterance of a dyadic dialog. The second evaluation schedule is performed at a dialog segment level, which is a predefined series of adjacent utterances.

Classifying INFO Values

A logistic regression model may be used to model the likelihood of a value with respect to the INFO slot for the respective topic. The decision is supported by n-grams (1, 2 and 3) of raw and stemmed tokens using the pre-processing and classifiers above and one model is produced for each topic. The model is $l_1$ regularized, with hyper-parameters optimized using 5-fold cross-validation on the training set. Independent models may be learned for each topic, which may have varying performance. All segment utterances encountered so far may be used for training and prediction and the top value retained. The topics FOOD (78.6% F1), TRANSPORTATION (75.3% F1) and ACCOMMODATION (71.9% F1) perform well, but ATTRACTION (66.0% F1) and ACCOMMODATION (52.9% F1) did not perform as well.

The overall measurement is divided into two schedules. The first schedule corresponds to an utterance based tracking, where the scoring is performed after each utterance of a dyadic dialog. The second evaluation schedule is done at a dialog segment level, which is a predefined series of adjacent utterances.

Experimental Results

Table 2 shows the results of systems trained on the DSTC4 training set and evaluated on the DSTC4 development set.

TABLE 2

Results on DSTC4 dev.

| Topic | Slot | Schedule 1 | | | Schedule 2 | | |
|---|---|---|---|---|---|---|---|
| | | P | R | F1 | P | R | F1 |
| ACCOMMODATION | INFO | 27.8 | 21.5 | 24.2 | 37.1 | 31.0 | 33.8 |
| ACCOMMODATION | NEIGHBORHOOD | 90.9 | 43.5 | 58.8 | 93.8 | 51.7 | 66.7 |
| ACCOMMODATION | PLACE | 70.8 | 8.3 | 14.8 | 80.0 | 13.1 | 22.5 |
| ACCOMMODATION | TYPE OF PLACE | 89.5 | 30.7 | 45.7 | 78.6 | 36.7 | 50.0 |
| ACCOMMODATION | All | 45.0 | 22.1 | 29.6 | 54.5 | 29.4 | 38.2 |
| ATTRACTION | ACTIVITY | 55.0 | 28.6 | 37.6 | 48.3 | 33.7 | 39.7 |
| ATTRACTION | INFO | 35.3 | 20.2 | 25.7 | 34.5 | 21.0 | 26.1 |
| ATTRACTION | NEIGHBORHOOD | 88.1 | 34.0 | 49.0 | 87.5 | 38.0 | 53.0 |
| ATTRACTION | PLACE | 79.9 | 23.6 | 36.4 | 75.9 | 35.6 | 48.4 |
| ATTRACTION | TIME | 31.0 | 40.0 | 35.0 | 40.0 | 40.0 | 40.0 |
| ATTRACTION | TYPE OF PLACE | 69.2 | 29.6 | 41.4 | 65.8 | 35.2 | 45.9 |
| ATTRACTION | All | 57.3 | 25.2 | 35.0 | 57.8 | 31.6 | 40.9 |
| FOOD | CUISINE | 91.4 | 17.6 | 29.5 | 87.5 | 23.0 | 36.4 |
| FOOD | DISH | 77.1 | 22.0 | 34.2 | 68.4 | 26.0 | 37.7 |
| FOOD | DRINK | 0.0 | 0.0 | 0.0 | 0.0 | 0.0 | 0.0 |
| FOOD | INFO | 58.4 | 19.1 | 28.8 | 62.5 | 20.4 | 30.8 |
| FOOD | MEAL TIME | 25.8 | 85.0 | 39.5 | 27.3 | 75.0 | 40.0 |
| FOOD | NEIGHBORHOOD | 76.8 | 37.3 | 50.2 | 76.5 | 44.8 | 56.5 |
| FOOD | PLACE | 100.0 | 15.3 | 26.5 | 100. | 13.8 | 24.2 |
| FOOD | TYPE OF PLACE | 58.0 | 38.0 | 45.9 | 50.0 | 42.4 | 45.9 |
| FOOD | All | 66.4 | 23.8 | 35.0 | 64.0 | 27.8 | 38.8 |
| SHOPPING | INFO | 7.3 | 4.4 | 5.5 | 9.5 | 5.3 | 6.8 |
| SHOPPING | NEIGHBORHOOD | 62.9 | 22.4 | 33.1 | 91.7 | 35.5 | 51.2 |
| SHOPPING | PLACE | 7.5 | 2.6 | 3.9 | 21.4 | 10.0 | 13.6 |
| SHOPPING | TIME | 0.0 | 0.0 | 0.0 | 0.0 | 0.0 | 0.0 |
| SHOPPING | TYPE OF PLACE | 36.1 | 14.7 | 20.9 | 43.9 | 40.0 | 41.9 |
| SHOPPING | All | 23.9 | 10.6 | 14.7 | 38.6 | 23.6 | 29.3 |
| TRANSPORTATION | FROM | 0.0 | 0.0 | 0.0 | 0.0 | 0.0 | 0.0 |
| TRANSPORTATION | INFO | 52.1 | 25.7 | 34.4 | 48.0 | 30.0 | 36.9 |
| TRANSPORTATION | LINE | 56.7 | 37.0 | 44.7 | 50.0 | 50.0 | 50.0 |
| TRANSPORTATION | STATION | 100.0 | 03.3 | 6.5 | 100. | 20.0 | 33.3 |
| TRANSPORTATION | TICKET | 61.3 | 52.8 | 56.7 | 66.7 | 66.7 | 66.7 |
| TRANSPORTATION | TO | 15.0 | 1.0 | 1.8 | 28.6 | 3.2 | 5.8 |
| TRANSPORTATION | TYPE | 61.7 | 48.5 | 54.3 | 63.1 | 49.4 | 55.4 |
| TRANSPORTATION | All | 53.3 | 22.9 | 32.0 | 54.2 | 25.0 | 34.2 |
| All | All | 52.7 | 22.8 | 31.8 | 55.6 | 28.8 | 38.0 |

The results per-topic are largely distributed around 38% F1 although shopping and transportation topics has lower performance. Within topics, the results are more variable, with 0% F1 on some topic/slot combinations such as food/drink.

The models were retrained on dstc4 train and dstc4 dev for evaluation on the dstc4 competition. The present system performed very well, in comparison with the best model on the dstc4 test. Table 3 shows overall scores and those of the top-performing system (Dernoncourt, et al., "Robust Dialog State Tracking for Large Ontologies," arXiv:1605.02130v1, pp. 1-12, 2016). The Dernoncourt system, however, is a mainly rule-based tracking method which uses a handcrafted tracking model. Numbers in parenthesis indicate the rank of the system for a given performance measure on the competition. Notably, although performance of the present system is bounded by low recall, it has the highest precision of all systems in the competition. Adding the spectral method for contextualization gave significant improvements to the present method.

TABLE 3

Results on dstc4 test for topic/slot all/all. Ranks are shown in parentheses

| | Schedule 1 | | | Schedule 2 | | |
|---|---|---|---|---|---|---|
| System | P | R | F1 | P | R | F1 |
| Dernoncourt system | 53.0 (3) | 50.3 (1) | 51.6 (1) | 54.4 (3) | 58.7(1) | 56.5 (1) |
| Present system (without context) | 56.2 (1) | 23.1 (5) | 32.8 (5) | 59.4 (1) | 28.5 (5) | 38.5 (4) |
| Present system (with context) | 67.1 (1) | 41.1 (3) | 51.0 | 69.1 (1) | 48.5 (3) | 57.0 |

The overall performance is 69.1% precision on Schedule 2 and shows high precision at the cost of recall, a pattern that is also reflected in schedule 1 results.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for dialog state tracking in a dialog system for conducting a dialog between a virtual agent and a user, the method comprising:
    providing an ontology in which a set of values are indexed by slot;
    receiving a user utterance and, with a speech-to-text converter, converting the user utterance to a text string comprising a segment of a dialog;
    detecting mentions in the dialog segment;
    extracting candidate slot values from the ontology, based on the detected mentions;
    ranking the candidate slot values, comprising computing a feature vector for each detected mention and ranking the candidate slot values with a prediction model trained on (slot, value) pair labels and feature vectors for mentions in a set of training dialog segments, the feature vectors include values for lexicalized and delexicalized features for the detected mention; and
    updating a dialog state based on the ranking of the candidate slot values; and
    outputting a dialog act of the virtual agent, based on the updated dialog state,
    wherein the converting of the utterance, detecting mentions, extracting candidate slot values, ranking the candidate slot values, and updating the dialog state are performed with a processor.

2. The method of claim 1, further comprising:
    for each of a set of the slots, predicting whether the slot value has been instantiated or modified; and conditioning the updating of the dialog state based on the slot predictions.

3. The method of claim 2, wherein the prediction is performed with a spectral tracking model based on a representation of the segment of the dialog and prior slot predictions.

4. The method of claim 1, wherein the detecting of mentions in the dialog segment comprises identifying noun phrases in the text string.

5. The method of claim 1, wherein the extracting candidate slot values from the ontology based on the detected mentions comprises searching the index of ontology values to extract candidate matches for each identified mention.

6. The method of claim 1, wherein the providing of the indexed ontology comprises generating the indexed ontology using at least one of stemming, n-gram analysis, and word embedding for cosine similarity computation for each of a set of values for each slot.

7. The method of claim 1, wherein the method comprises, for each of a plurality of iterations, receiving a segment of a dialog, detecting mentions in the dialog segment, extracting candidate slot values from the ontology based on the detected mentions, ranking the candidate slot values, and updating a dialog state based on the ranking of the candidate slot values.

8. The method of claim 7, further comprising executing a task based on the updated dialog state of at least a subsequent one of the iterations.

9. The method of claim 1, further comprising generating an agent dialog act based on the updated dialog state.

10. The method of claim 1, further comprising detecting a user's intent for the dialog, identifying a topic based on the detected intent, and wherein the extracting candidate slot values from the ontology is also based on the identified topic.

11. The method of claim 1 further comprising learning the ranking model using features for encoding a match between an extracted mention and a candidate slot, value pair.

12. The method of claim 1, wherein the features are selected from the group consisting of lemma form, maximum edit distance, word embeddings, and combinations thereof.

13. A method for dialog state tracking in a dialog system for conducting a dialog between a virtual agent and a user, the method comprising:
providing an ontology in which a set of values are indexed by slot;
receiving a user utterance and, with a speech-to-text converter, converting the user utterance to a text string comprising a segment of a dialog;
detecting mentions in the dialog segment;
extracting candidate slot values from the ontology, based on the detected mentions;
ranking the candidate slot values;
for each of a set of the slots, predicting whether the slot value has been instantiated or modified, the prediction being performed with a spectral tracking model based on a representation of the segment of the dialog and prior slot predictions, wherein in the spectral tracking model, for each of set of dialog segments, each slot is associated with a first vector of discrete variables representing an initial state and a second vector of discrete variables representing a next state, wherein in each vector, a first of the variables indicates whether the slot has been instantiated, a second of the variables indicates whether the value of the slot has been modified, and a third of the variables indicates whether the value of the slot is non-instantiated; and
updating a dialog state based on the ranking of the candidate slot values, the updating of the dialog state being conditioned based on the slot predictions; and
outputting a dialog act of the virtual agent, based on the updated dialog state,
wherein the converting of the utterance, detecting mentions, extracting candidate slot values, ranking the candidate slot values, and updating the dialog state are performed with a processor.

14. The method of claim 13, wherein the ranking of the candidate slot values comprises computing a feature vector for each detected mention and ranking the candidate slot values with a prediction model trained on (slot, value) pair labels and feature vectors for mentions in a set of training dialog segments.

15. A system comprising memory which stores instructions for performing the method of claim 1 and a processor in communication with the memory for executing the instructions.

16. A computer program product comprising non-transitory memory storing instructions which, when executed by a computer, perform the method of claim 1.

17. A dialog system comprising:
a speech-to-text converter, which converts a human-generated utterance to a text string; and
a system for dialog state tracking comprising:
memory which stores an ontology in which a set of values are indexed by slot;
a mention detection component, which detects mentions in an input dialog segment of a dialog comprising the text string;
a searching component, which extracts candidate slot values from the ontology, based on the detected mentions;
a ranking component, which ranks the candidate slot values;
an update component, which updates a dialog state based on the ranking of the candidate slot values; and
a contextualizing component, which conditions the updating of the dialog state for at least one of the slots based on a prediction that the value of the slot has been instantiated or modified, the prediction being made independently of the candidate slot values, the prediction being made with a spectral tracking model which has been learned using sequences of dialog turns annotated with corresponding state descriptors, each state descriptor including, for each slot of the dialog state, an indicator that encodes whether the slot is not-instantiated, instantiated, or modified;
an output component which outputs a dialog act; and
a processor which implements the mentioned detection component, searching component, ranking component, update component, and contextualizing component.

18. The system of claim 17, further comprising a learning component which learns the ranking model based on feature vectors for mentions that are matched to respective slot, value pairs.

19. The system of claim 17, further comprising a learning component which learns a temporal model by matrix factorization which predicts whether the value of the slot has been instantiated, modified or is unchanged, and wherein the updating of the dialog state for at least one of the slots is conditioned on the output of the temporal model.

20. The system of claim 17, wherein the ranking component ranks the candidate slot values with a ranking model which estimates the probability of a (slot, value) pair given a mention, with parameters of the model and feature functions which relate mentions to (slot, value) pairs.

21. In a dialog system for conducting a dialog between a virtual agent and a user, a method comprising:
- receiving a user utterance and, with a speech-to-text converter, converting the user utterance to a text string comprising a segment of a dialog;
- detecting mentions in the dialog segment of the dialog;
- identifying candidate slot values in an ontology of (slot, value) pairs, based on the detected mentions, the values being linguistically preprocessed such that a given slot value in a (slot,value) pair is matched to a plurality of different mentions;
- ranking the identified candidate slot values using a classifier trained on a set of features extracted from mentions and respective (slot,value) pair labels;
- updating a dialog state based on the ranking of the candidate slot values, the updating of the dialog state for at least one of the slots being conditioned on the output of a temporal model which predicts whether the value of the slot has been instantiated, modified or is unchanged; and
- outputting a dialog act of the virtual agent,
- the detecting mentions, identifying candidate slot values, and the updating of the dialog state being implemented by a processor.

* * * * *